April 11, 1950   J. L. KLEINMAN   2,503,275
ADJUSTABLE EYEGLASS TEMPLE
Filed July 17, 1945
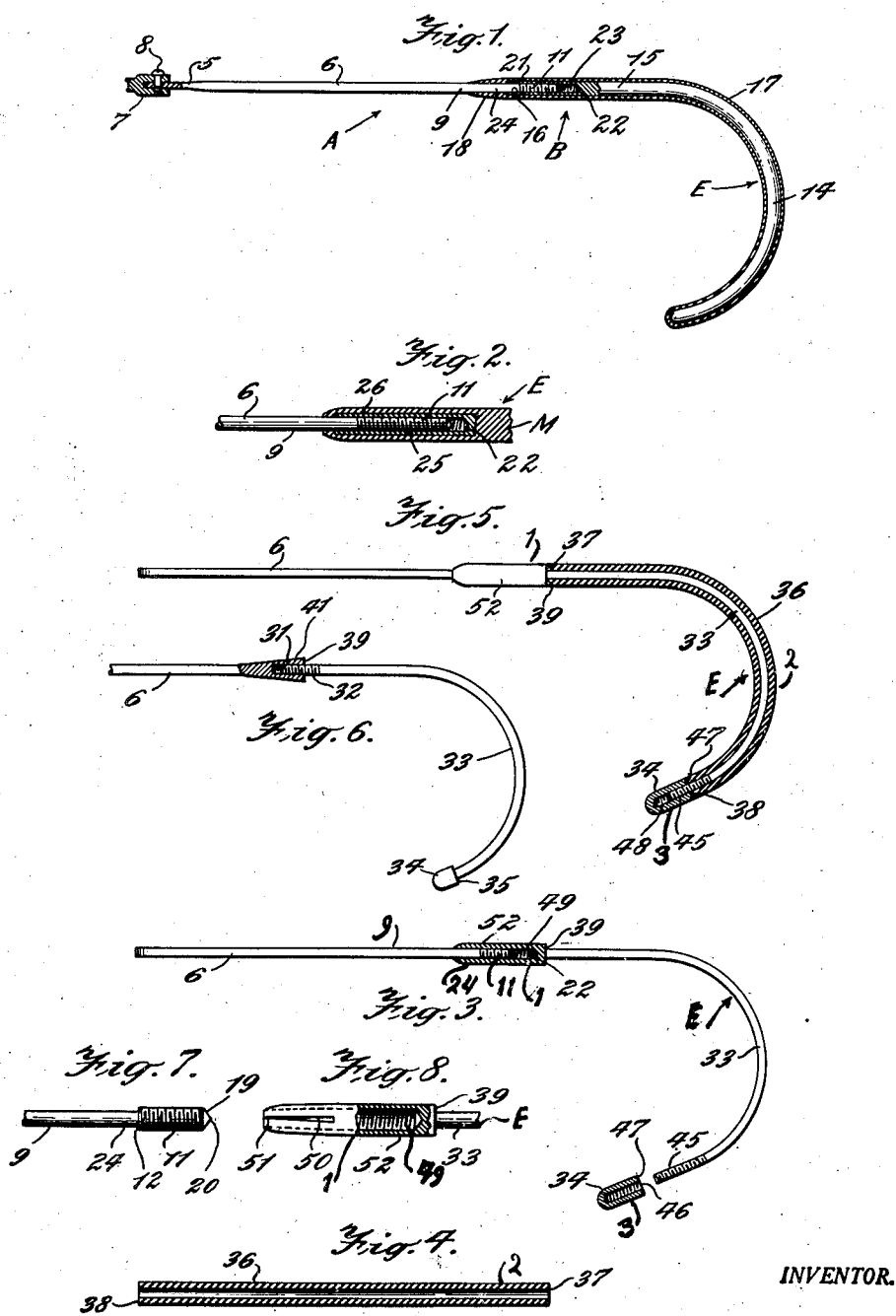
INVENTOR.
Jacob L. Kleinman Patented Apr. 11, 1950

2,503,275

UNITED STATES PATENT OFFICE 2,503,275

ADJUSTABLE EYEGLASS TEMPLE

Jacob L. Kleinman, New York, N. Y.

Application July 17, 1945, Serial No. 605,499

4 Claims. (Cl. 88—52)

This invention relates to adjustable temples and more particularly to a type of a temple structure wherein the length of such temple may be readily adjusted into various desirable sizes, and wherein each individual temple may be used either as a right-hand temple or as a left-hand temple, and wherein undesirable, or broken parts, or ear-hook members may be easily removed or replaced by the wearer without the assistance of skilled and costly help.

My novel temple structure is capable of being utilized in connection with various styles or types of eye-glasses, field glasses, opera glass, lenses, eye-glass supporters or frames, but particularly with the type, for example, provided with ear-hooks or the like.

In accordance with my invention, I produce a temple structure comprising a straight shank-bar of which one end portion is provided with an eye-glass supporter and the other end portion is interlocked in a rotatable screw-threaded connection with an ear-hook element in a manner permitting the adjustment of the length of such temple into various desirable sizes, and wherein each individual temple structure can be used either as a right-hand temple or a left-hand temple, or wherein such ear-hook element may be removed from said shank-bar and a new one put in its place, and wherein such ear-hook may be provided with removably-mounted cushioning means, arranged to be held in place by portions of the temple structure located adjacent to the end portions of said cushioning means, in a manner providing a continuous evenly finished smooth surface, so that the ear-hook element may be utilized without any danger of injuring or irritating the skin behind the wearer's ears, thereby facilitating the use of such temple member and increasing its commercial value.

There is, therefore, thus produced in accordance with my invention, a temple structure capable of being adjusted into various sizes in length, and be used either as a right-hand temple or as a left-hand temple, and having its ear-hook element, or parts thereof removed, exchanged or replaced, so that an eye-glass set provided with my temples may be worn with great comfort and be adjusted without the necessity of employing skilled and costly help.

To illustrate the ordinary commercial utility of my novel temple structure in daily life, a temple constructed in accordance with my invention of whatever style or type it may be made, could be utilized to great advantage, for example, a merchant in order to meet business requirements must carry in his stock an ample supply of temples of various sizes. The sizes usually range in length from 5½ inches, running in quarter inch sizes, up to 7 inches. These temples come in pairs, namely, a right hand temple and a left-hand temple. Should one temple of a pair get lost or become useless then the other temple of such pair will become a waste and financial loss to the merchant, because, a left-hand temple cannot be used to take the place of a right-hand temple, nor can a right-hand temple be used to take the place of a left-hand temple. But with applicant's structure, of whatever style or type it may be made, each individual temple can be used either as a right-hand temple or as a left-hand temple, thereby eliminating the necessity of buying "pairs" and minimizing waste possibilities. Furthermore, the fact that the length of the temple, made in accordance with my invention, can be easily adjusted to suit the individual requirement, will eliminate the necessity for the merchant to keep on hand a large stock of temples of various sizes to meet his business requirements. Particularly will applicant's invention eliminate the necessity of buying "pairs," so that his stock of temples, although of a moderate amount, will amply fill the necessary business requirement. Such stock of temples will therefore always be fresh in appearance, convenient to handle, and of commercial value. In addition to the above, the space so saved may be utilized for carrying other suitable items which may be found necessary to increase the merchant's business.

Particularly would such temple structure be utilized to great advantage in daily use by the wearer. For example, when desirous to have the eye-glasses adjusted, to bring same closer to the eyes, the average person has to engage the assistance of a skilled professional party to do such adjustment. Such a party while making such adjustment usually bends and reshapes the ear-hook of the temple, distorting the original shape of such ear-hook. In many instances such re-shaped ear-hook does not conform, nor does it readily adjust itself, to the curvature of the shape of the wearer's ear, oftentimes causing unnecessary painful irritation and annoyance to the wearer. But with temples constructed in accordance with applicant's invention, the wearer does not have to employ any skilled professional parties to adjust his eye-glass temples. All he has to do is to turn the ear-hook of the temple in the proper direction and such temple will become shorter in length thereby bringing the eye-glasses closer to the wearer's eyes. On the other hand, if the glasses appear to be too close to the wearer's eyes, or seem to touch the eye-brows, then by just turning the ear-hook in the opposite direction the size of the length of the temple will be increased thereby moving the glasses away from the wearer's eyes. The ear-hook, being rotatably adjustable in either direction, will more readily adjust itself into desired position around the wearer's ear.

Thus, an eye-glass temple made in accordance with my invention may be readily used by the individual wearer to great advantage and be worn in great comfort, as it can be easily adjusted to various desired sizes in a manner to suit the individual wearer's requirements; and broken or tarnished parts may be easily removed and replaced by other suitable parts, so that such temple will always have a clean, fresh and pleasing appearance. It is believed that such a temple structure will prove to be of commercial value.

The variety of possible applications of my novel temple construction in connection with different types of eye-glass items, as hereinabove indicated, is so prolific that for the purpose of illustrating the invention, the specific embodiment of my invention in its application to an eye-glass set exhibiting the greatest difficulties has been selected. Such eye-glass set is one which necessarily must conform most rigidly to the contours of the shape of the wearer's ears and nose and one which has the field of greatest possible commercial use. For this purpose I have selected for illustration of my novel construction an eye-glass temple wherein the adjustable feature may be shown, so that the principle of construction may be best illustrated in an eye-glass temple known as an adjustable eye-glass temple.

The objects of the present invention are attained by a novel construction which will be hereinafter described and illustrated in the drawing in connection with a specific embodiment of the invention.

In the accompanying drawing in which such specific embodiment of my invention is illustrated, Fig. 1 is a view of my adjustable eye-glass temple in the construction of which my invention has been embodied, partly in cross-section, showing the screw-threaded interlocking means between the shank-bar and ear-hook.

Fig. 2 is an enlarged modified view, partly in cross-section, showing the interlocking arrangements between the shank-bar and ear-hook.

Fig. 3 is a view of the temple, partly in cross-section, showing the ear-hook with the cap removed and in a position adapted to receive the cushioning member, and also showing the screw-threaded engagement between the ear-hook and shank-bar.

Fig. 4 is a view, in cross-section, of the tubular cushioning member adapted to be slipped over the ear-hook.

Fig. 5 is a view showing my adjustable temple structure in an assembled form wherein the surfaces of the end section and the cushioning member and the cap meet on a level uniformity in a manner providing a continuous evenly finished smooth surface.

Fig. 6 is a view showing that if desired the cap may be made integral with the ear-hook, and also showing a modified form of the screw-threaded connections between the ear-hook and the shank-bar.

Fig. 7 is an enlarged view of the screw-threaded portion of the inner end section of the shank-bar, and Fig. 8 is an enlarged view, partly in cross-section, of the screw-threaded section of the inner end portion of the ear-hook, showing the open side slot located at the end portion of the wall of the oblong tubular cavity and also showing the swaged or pinched-together end portion forming a restricted front opening in a manner providing a spring-like frictional engagement between the meeting portions when in interlocked position.

Referring more particularly to the drawings, in which similar reference characters identify similar parts in the several views, in my novel adjustable eye-glass temples.

Arrow A indicates a completely finished temple, in assembled form, made in accordance with my invention, wherein the outer end portion 5 of the shank-bar 6 is hingedly secured to a portion of an eye-glass supporter 7 by suitable means, for example, a rivet or screw-threaded insert 8. The inner end portion 9 of the shank-bar 6 is provided with an externally screw-threaded end portion 11, for a purpose which will hereinafter be explained.

The ear-hook E comprises a body portion 14, made of any suitable material, having its inner end portion 15 provided with a screw-threaded section or opening 16. A coating 17, covering the body 14, may be provided with a beveled end section 18 covering the end portion 21 of the body 14 and the sharp edges thereof, thereby eliminating possible danger of injury or irritation to the wearer's skin.

This structure may be assembled in the following manner; the screw-threaded portion 11 of the shank-bar 6 is inserted through the front opening into the oblong tubular cavity 16 and engages the screw-threads thereof, then, by turning the ear-hook in the proper direction such portion 11 will move deeper within the cavity 16 until it will reach the wall section 22, in which case the temple structure will assume a certain length. However, by turning such ear-hook in the opposite direction the portion 11 of the shank-bar 6 will then move outwardly, in a direction away from the wall section 22, thereby gradually increasing the length of such temple structure.

The body member 14 of the ear-hook E may be eliminated if so desired, and such ear-hook E may be made of a molded material M (Fig. 2) and be provided with an internally screw-threaded bushing 25 held within the ear-hook member E as at 26, such bushing being adapted to receive the end portion 11 of the shank-bar 6 in the same manner and for the same purpose as that of Fig. 1.

If desired, the body 14 of the ear-hook E may be made of a lesser diameter than that of its inner end portion 52, for example, as at 33 (Fig. 3). Such end portion 52 is provided with an internally screw-threaded oblong cavity 49 and with a rear-end wall 39. The outer end section of said ear-hook E is provided with an externally screw-threaded portion 45 and with a removably mounted cap 34. Said cap 34 is provided with an internally screw-threaded opening 46 and with a rear-wall 47.

This structure may be assembled in the following manner: the tubular member 36 (Fig. 4) may be slipped over the body 33 until its wall 37 engages the wall 39 of the inner end portion 52, the cap 34 is then secured to the threaded portion 45 until its wall 47 engages the wall 38, thus holding the member 36 in a non-movable manner upon the ear-hook E. The screw-threaded end portion 11 of the shank-bar 6 is then rotatably inserted into the screw-threaded cavity 49 of the inner end portion 52 thereby forming a completed unitary temple structure in a manner as shown in Fig. 5. It will be seen that the surfaces 1, 2 and 3 meet on a leveled uniformity in a manner providing the ear-hook E with a continuous evenly finished smooth surface, thereby eliminating the danger of injury or irritation to the wearer's skin.

It is a known fact that material deteriorates in time, and that there is a natural dislike against deteriorated material, particularly when in connection with eye-glass temples, wherein the deteriorated material comes in direct contact with the skin alongside the face and around the wearer's ear. Such skin portions are of a quite delicate nature and may be dangerously affected by such contact. It is therefore of great importance, in fact an actual necessity, for the wearer to have his deteriorated temples exchanged for new temples. At the present time the wearer has to engage skilled professional services to exchange his temples; a matter which causes loss of time, is costly and a source of annoyance to the wearer.

Whereas, with temples made in accordance with applicant's present invention, all the above-mentioned inconveniences are eliminated. All the wearer would have to do is to remove the cap 34, then remove the old tubular member 36, and replace same with a new tubular member, and then replace the cap to its former position. As a matter of fact, the entire ear-hook E could be removed as a unit from the shank-bar 6, and be replaced with a new ear-hook unit, and thus remove or replace deteriorated parts. Furthermore, the wearer may have in his possession ear-hook units of various styles or designs and exchange same, replacing those being worn, to suit particular occasions, without the necessity of engaging skilled and costly professional assistance and without loss of time.

If desired, the inner end section of the shank-bar 6 may be provided with an internally screw-threaded oblong cavity 31 (Fig. 6), and the inner end portion of the ear-hook 33 may be provided with an externally screw-threaded section 32 adapted to be interlocked within the cavity 31. The outer end portion of the ear-hook element 33 may be provided with a bulb 34 terminating in a shoulder 35.

This structure may be assembled in the following manner; the ear-hook 33 is removed from the shank-bar 6, the tubular member 36 (Fig. 4) is slipped over the ear-hook 33 until the end wall 38 fits against the wall 35 of the bulb 34, the screw-threaded end portion 32 is then inserted into the screw-threaded cavity 31 and the ear-hook 33 is then rotated in the proper direction until the end wall 37 of the tubular member 36 fits against the shoulder 39 of the wall 31. When thus assembled, the appearance of the temple will be similar to that as shown in Fig. 5.

The screw-threaded portion 11 of the inner end portion 9 of the shank-bar 6 is shorter in length than that of the screw-threaded cavity 49, and extends above the surface 24 of such portion 9, in a manner as shown at 12 (Fig. 7), so that when positioned within the cavity 49 of the inner end portion 52 (Fig. 8), such threads 11 will be engaged by the screw-threads of said cavity 49 but the unthreaded shank portion 9 will move freely therein, thereby facilitating the adjustment operation of the length of the temple structure.

The front part of the cavity wall of the inner end portion 52 of the ear-hook E may be provided with a narrow open slit 50 (Fig. 8) formed in a manner enabling the end wall portion 51 to be swaged or clamped together thereby forming a restricted front opening at such end wall portion 51 of a size smaller than the interior portion of such cavity, so that when the screw-threaded portion 11 of the inner end portion 9 is to be inserted into the cavity 49, the end portion 20 will first enter into said cavity 49 and the tapered wall 19 will cause the restricted front opening 51 to spring open to an extent whereby the screw threads thereof will engage the screw threads 11 in a frictional springlike manner thereby permitting such threads to fully interlock with each other thus facilitating firm gripping therebetween. Such restricted front opening 51 is also adapted to engage the portion 9 in a likewise springlike frictional manner thereby eliminating, or minimizing, unnecessary "play" or vibration between the interlocked parts of the ear-hook and the shank-bar so that a substantially rigid unitary temple structure is thus provided.

A merchant must always carry in his stock sets or pairs of temples, because a right-hand temple cannot be utilized as a left-hand temple, nor can a left-hand temple be utilized as a right-hand temple. If one of such a pair of temples becomes tarnished, misplaced or broken, then the other temple of that pair becomes worthless and a financial loss to the merchant. Oftentimes quite a large amount of such worthless temples accumulate occupying space that could be used beneficially for other purposes, thus constituting a problem which is not solvable to the average merchant.

But applicant's present invention solves such a problem completely. Because turning the ear-hook of applicant's temple structure, upon the interlocked screw-threaded portion, in one direction will make the structure a right-hand temple; whereas turning the same ear-hook in the opposite direction will make the same temple structure a left-hand temple. So that each individual temple made in accordance with applicant's present invention can be used either as a right-hand temple or a left-hand temple, thus eliminating the present system of manufacturing, selling or buying "sets" or "pairs" of temples, so that if a temple made in accordance with applicant's teachings would become tarnished or be misplaced then it would only entail that much loss and not the loss of another temple with it, thus eliminating unnecessary waste of merchandise and of valuable business space, thereby reducing financial loss to the merchant.

If desired, the portion 9 of the shank-bar 6 may be provided with a plurality of spaced apart screw-threaded portions 11, that is, several individual screw-threaded portions of short length separated from each other by a short unthreaded shank-bar space. In which case only the portion of the restricted front opening 51 of the section 52 would have to be provided with an internal screw-threaded portion, but the rest of the interior of the cavity 49 may remain unthreaded, so that when it is desired to adjust the length of the temple structure the threaded restricted front opening 51 will engage the first threaded portion 11, and then while being rotated, pass same as well as the adjacent unthreaded shank portion and engage the second threaded portion 11, thereby not only speeding up the adjustment operation, but also eliminating the necessity of having the entire length of the interior portion of the opening 49 provided with a continuous screw-threaded wall. The several spaced apart screw-threaded portions 11, because of their short length and small gauge in thickness of the threads, may act as an ornamental feature or design for the shank-bar 6, and also as a measurement for the adjustment for the length of the temple structure.

It is quite understood, that the length of the shank-bar, or of the ear-hook, is a matter of choice with the manufacturer. If desired, the length of the ear-hook may be that of the full length of the temple, and the length of the shank-bar may be approximately one inch, or so, and they may be interlocked with each other in a rotatable manner at a point almost adjacent to the eye-glass supporter. Thus the temple structure may resemble in appearance the present type of temples, and yet, contain some, or all, of the features of applicant's invention. Particularly would such a structure be suitable in connection with temples made of plastic, tortoise-shell, mother-of-pearl, or of any other similar, or suitable, material.

It is, naturally, optional with the manufacturer to make changes in the construction of the parts of the temple unit as he may see fit, for example, the shank-bar may be provided with the internally screw-threaded tubular opening and the ear-hook may be provided with the externally screw-threaded section, or other suitable changes in the form of structure may be resorted to without departing from the spirit of this invention.

From the above it will be evident that applicant's invention, namely, an eye-glass temple, constructed in a manner, wherein each individual temple may be utilized either as a right-hand temple or as a left-hand temple, and provided with means enabling the ear-hook to be removed from the shank-bar, and having the ability of being adjusted to various sizes in length, the ability of removing deteriorated elements and replacing same with new parts, and holding such parts in a locked stationary position, and wherein the periphery of the ear-hook is provided with a continuous evenly finished smooth surface, and the ability of retaining the shank-bar and ear-hook as a combined unitary structure in a substantially rigid manner, the ability of changing the appearance of the design or style of the temple or ear-hook, are all desirable features and are believed to be beneficial to the user and therefore of commercial value to the manufacturer and consumer.

From the above it will be seen that I have invented and perfected an adjustable eye-glass temple of a new and unique design, an eye-glass temple which is practical, useful and therefore of commercial value, and although I have shown certain preferred forms or illustrations in order to explain and describe the novelty of my invention, yet, by showing such structure, I do not, by any means, limit myself to these structures, nor to the terms used in describing same, as they are for illustrative purposes only. Various suggestions and changes of structure may be resorted to, and I desire it to be understood that I have same in mind when showing and describing this invention, and seek protection by Letters Patent. And, although I have mentioned in describing this invention of what material certain parts may be made, how they may be formed, shaped or styled and how they may be assembled, yet I desire it to be understood that this structure, or parts thereof, may be made of any suitable material, and shaped, formed, styled or arranged in any desirable manner, and assembled in any convenient way so that the parts may be easily taken apart, removed, cleaned, replaced and reassembled, and that various changes in detail may be resorted to without departing from the spirit of this invention.

I claim:

1. An eye-glass temple structure comprising an ear-hook and a shank-bar, the said ear-hook and the said shank-bar each having an inner end portion, one of said inner end portions provided with an oblong tubular cavity, the front wall portion of said cavity provided with an open slit, said front portion being clamped together in a manner reducing the diameter of the front opening of said cavity to a size smaller than the size of the interior of such cavity, the interior of said front portion provided with screw-threads, the other of said inner end portions provided with an external screw-threaded section, said section adapted to be positioned within the said cavity, the threads of said slitted front portion adapted to engage the said external threads in an adjustable spring-like friction-fit manner thereby facilitating firm gripping between the said threads and minimizing vibration of the said ear-hook while the latter is being rotated, said rotation adapted to adjust the length of said temple into various desirable sizes and to enable the use of such temple either as a right-hand temple or a left-hand temple, said shank-bar provided with means adapted to support an eye-glass, said ear-hook and said shank-bar adapted to be separated from each other.

2. A longitudinal adjustable temple structure comprising two individual members, one of said members having an enlarged relatively short cylindrical head at the inner end thereof, the enlarged cylindrical head being of a slightly greater diameter than the thickness of the member adjacent to said cylindrical head, screw-threads extending over the entire length of the said cylindrical head, the other of said members having a rigid sleeve portion at the inner end thereof, said sleeve having a plurality of resilient fingers which are normally biased inwardly toward the axis of the rigid sleeve but forming an expansible cylindrically shaped sleeve portion coextensive with the rigid sleeve when said fingers are urged outwardly by the insertion of the said cylindrical head, the internal portions of the resilient fingers being screw-threaded to coact with the threads of said cylindrical head, the rigid sleeve and the finger portions forming a relatively long bore into which the cylindrical head may be inserted and frictionally held therein in various adjusted positions, said resilient fingers biasing the threads thereon into contact with the threads of the cylindrical head when the latter is screwed into the expansible sleeve, the outer end of one of said members provided with an ear-hook and a pivotal connection adapted to be connected to the outer end of the other of said members.

3. A longitudinally adjustable temple structure comprising two individual members, one of said members having an enlarged relatively short cylindrical head at the inner end thereof, the said head being of a slightly greater diameter than the thickness of the said member adjacent to the said head, screw-threads extending over the entire length of said head, the other of said members having a rigid sleeve portion at its inner end, the internal diameter of the said sleeve being screw-threaded and adapted for cooperation with the screw-threads of said cylindrical head, said sleeve having a plurality of resilient fingers which are normally biased inwardly toward the axis of the rigid sleeve but forming an expansible cylindrically shaped sleeve portion coextensive with the rigid sleeve when said fingers are urged outwardly by the insertion of the said cylindrical head, the internal portions of the resilient fingers being screw-threaded to coact with the threads of said head, the threaded rigid sleeve and the threaded finger portions forming a relatively long bore into which the said head may be inserted and frictionally held therein at various adjusted positions, said resilient fingers biasing the threads thereon into contact with the threads of the cylindrical head when the latter is screwed into the expansible sleeve, said resilient fingers frictionally engaging the portion of the member adjacent to said cylindrical head when the said head is enclosed within the said rigid sleeve, the outer end of one of said members provided with an ear-hook and a pivotal connection adapted to be connected to the outer end of the other of said members.

4. A longituidinal adjustable temple structure comprising two individual separable members, each of said members having an inner end portion, one of said inner end portions provided with a series of screw-threads, said threads forming an enlarged relatively short cylindrical head, said head being of a slightly greater diameter than the thickness of the portion of the member adjacent thereto, the other of said inner end portions having a rigid sleeve, said sleeve having at least one resilient finger, said finger being normally biased inwardly toward the axis of the rigid sleeve and forming an expansible portion coextensive with the rigid sleeve when said finger is urged outwardly by the insertion of the said cylindrical head, the internal face of said finger being screw-threaded to coact with the threads of the said head, the rigid sleeve and the said finger forming a relatively long bore into which the said head may be inserted and frictionally held therein in various adjusted positions, said resilient finger biasing the threads thereon into contact with the threads of the cylindrical head when the latter is positioned within the said sleeve, the outer end of one of said members provided with an ear-hook, and an eye-glass supporting element adapted to be connected to the outer end of the other of said members.

JACOB L. KLEINMAN.

REFERENCES CITED

The following references are of record in the file of this patent:

UNITED STATES PATENTS

| Number | Name | Date |
|---|---|---|
| 125,922 | Will et al. | Apr. 23, 1872 |
| 1,614,848 | Nerney | Jan. 18, 1927 |
| 1,751,804 | Fischer | Mar. 25, 1930 |
| 1,841,052 | Pollmiller | Jan. 12, 1932 |

FOREIGN PATENTS

| Number | Country | Date |
|---|---|---|
| 274,287 | Great Britain | July 21, 1927 |
| 291,156 | Great Britain | May 29, 1928 |
| 493,820 | Germany | Mar. 12, 1930 |